United States Patent [19]

Baba

[11] Patent Number: 4,530,484
[45] Date of Patent: Jul. 23, 1985

[54] MOLD FOR MOLDING WHEEL COVER HAVING SPOKE-LIKE PORTIONS

[75] Inventor: Yuko Baba, Yokohama, Japan

[73] Assignees: Nissan Motor Co., Ltd.; Hashimoto Forming Kogyo Co., Ltd., both of Yokohama, Japan

[21] Appl. No.: 623,685

[22] Filed: Jun. 22, 1984

[30] Foreign Application Priority Data

Jun. 30, 1983 [JP] Japan .................. 58-118848

[51] Int. Cl.³ .................. B29D 3/02; B22C 9/28
[52] U.S. Cl. .................. 249/56; 249/95; 249/160; 425/468; 425/129 R; 425/588
[58] Field of Search .................. 249/56, 95, 96, 105, 249/107, 160; 425/468, 129 R, DIG. 44, 588

[56] References Cited

U.S. PATENT DOCUMENTS

| 290,081 | 12/1883 | Mohau | 249/56 X |
|---|---|---|---|
| 1,311,684 | 7/1919 | Fitch | 249/95 X |
| 2,203,787 | 6/1940 | Hasted | 249/96 X |
| 2,356,585 | 8/1944 | Hempel | 425/468 X |
| 2,445,405 | 7/1948 | Norris | 249/95 |
| 2,699,361 | 1/1955 | Jenkins et al. | |
| 2,878,517 | 3/1959 | Cramer | 249/107 |
| 3,480,070 | 11/1969 | Beetle et al. | 249/105 X |
| 3,964,144 | 6/1976 | Kopp | 249/56 X |
| 4,166,653 | 9/1979 | Claucherry | |
| 4,275,930 | 6/1981 | Kamihama | |
| 4,355,848 | 11/1982 | Ookubo et al. | |
| 4,364,608 | 12/1982 | Ookubo et al. | |
| 4,419,908 | 12/1983 | Reikowski | 249/56 X |
| 4,436,133 | 3/1984 | Rohr | 249/56 X |

FOREIGN PATENT DOCUMENTS 55-160602 12/1980 Japan .
2013590 1/1979 United Kingdom .

Primary Examiner—J. Howard Flint, Jr.
Attorney, Agent, or Firm—Schwartz, Jeffery, Schwaab, Mack, Blumenthal & Evans

[57] ABSTRACT

A mold for molding a wheel cover for a vehicle road wheel by injection molding of a synthetic resin or die casting of a light metal alloy, the wheel cover being a one-piece member having spoke-like portions extending obliquely with respect to both the center axis and radii of the wheel cover. To form the spoke-like portions each as a straightly extending portion, one of the two mold members which can be brought into contact with each other to provide cavities therebetween has a portion in the form of a truncated pyramid and the other is recessed to have a plurality of flat faces which are respectively opposite to and can mate with the flat side faces of the truncated pryamid, and these side faces or the flat faces in the opposite mold member, or both, are formed with elongate and straight grooves in which the spoke-like portions are formed.

3 Claims, 9 Drawing Figures

FIG.1
FIG.2
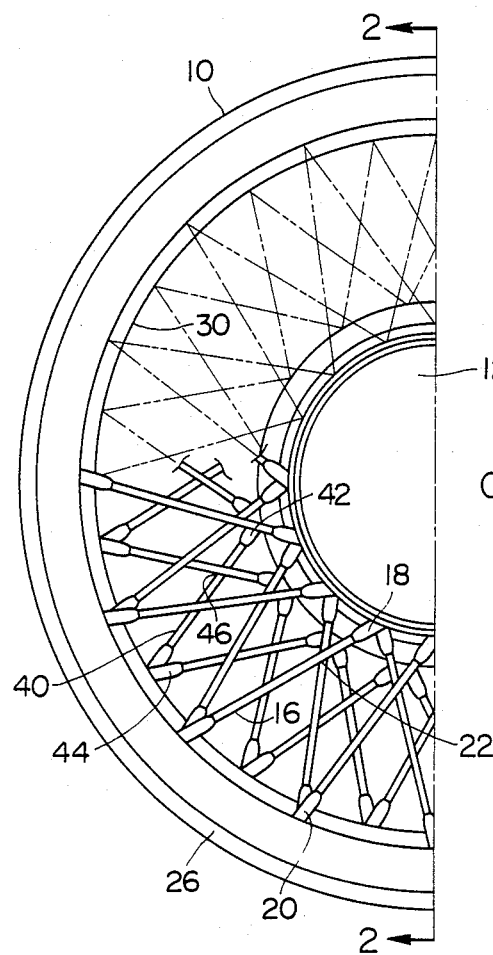
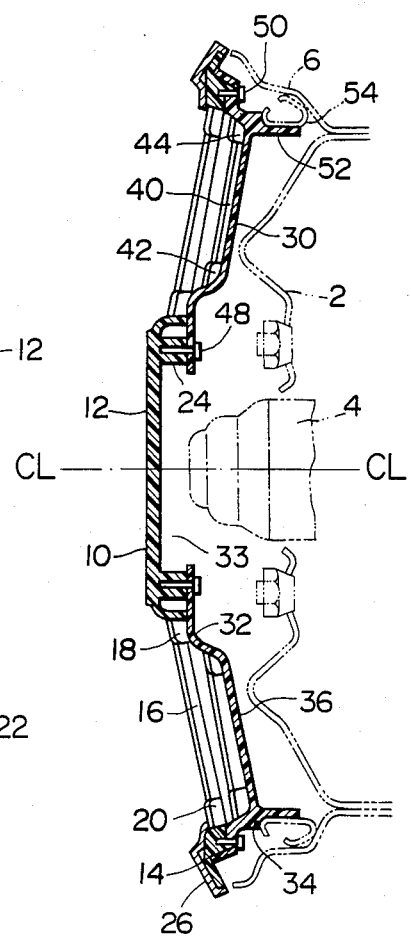

MOLD FOR MOLDING WHEEL COVER HAVING SPOKE-LIKE PORTIONS

BACKGROUND OF THE INVENTION

This invention relates to a mold for molding a melted material into a wheel cover for a vehicle road wheel, the wheel cover being of the type having spoke-like portions integrally extending from a central portion to an annular radially outer peripheral portion.

For automobile road wheels, wheel covers having spokes or spoke-like portions are now in fashion. Since wheel covers having real spokes of metal wires, rods or tubes are costly and relatively heavy, a recent trend is to form a wheel cover having spoke-like portions or simulated spokes by injection molding of a synthetic resin or die casting of a light metal alloy.

When every spoke-like portion in a molded wheel cover extends in the direction of a radial line passing through the center of the wheel cover there is little problem in forming the spoke-like portions as part of a one-piece member. In some cases, the spoke-like portions are arranged slant with respect to the radii of the molded wheel cover as shown, for example, in U.S. Pat. Nos. 2,699,361, 4,275,930, 4,355,848 and 4,364,608 and U.K. Pat. No. 2,020,610. Besides such slanting, the spoke-like portions are usually oblique with respect to the center axis of the wheel cover because the central portion of the wheel cover projects axially outward from the annular radially outer peripheral portion. In a mold for molding such a wheel cover, the spoke-like portions are respectively formed in elongate grooves. It is natural that the mold surface in which the grooves are formed becomes a conically tapered surface because of the axially distant arrangement of the central portion and the radially outer peripheral portion of the wheel cover. Then there arises a problem. A seemingly linear groove formed slantwise in a conical surface is a curved groove in reality, as will be understood by considering three-dimensionally. Therefore, the slant spoke-portions of the molded wheel cover have an arcuate shape, whereas usually the spoke-like portions are desired to be straight.

SUMMARY OF THE INVENTION

It is an object of the present invention to provide a mold for molding a melted material into a wheel cover for a vehicle road wheel, the wheel cover having spoke-like portions which are really straight and extend obliquely with respect to both the center axis and the radii of the wheel cover.

A mold according to the invention is for molding a wheel cover member which is a one-piece member having a plurality of spoke-like portions extending from a central portion of the cover member to a generally radially outer peripheral portion of the cover member obliquely with respect to the radii of the cover member and also with respect to the center axis of the cover member such that the afore-mentioned central portion is held axially outward from the aforementioned peripheral portion. The mold has first and second mold members correspondingly shaped so as to provide a first cavity to form the central portion, a second cavity to form the peripheral portion and a third cavity which connects the first and second cavities and in which the spoke-like portions are formed when the mold is closed by contact of the two mold members with each other. This mold is characterized in that the first mold member has a portion generally in the shape of a truncated pyramid of which the side faces provide a first group of flat surfaces slanting with respect to the center axis of the mold and of which the edges between the base thereof and the side faces are adjacent the second cavity, that the second mold member is recessed so as to provide a second group of flat surfaces which are respectively opposite to and can mate with the flat surfaces of the first group, and that the first group of flat surfaces or the second group of flat surfaces, or both, are formed with elongate and straight grooves which provide the aforementioned third cavity.

As disclosed in the above statement, in the mold according to the invention the obliquely extending spoke-like portions of the wheel cover member are formed in the straightly elongate grooves formed in flat surfaces. Therefore, the spoke-like portions are really straight irrespective of the degree of their obliqueness with respect to the central axis and radii of the wheel cover member. The grooves in the flat surfaces, and accordingly the spoke-like portions of the wheel cover member, can variously be arranged. For example, each of the flat side faces of the aforementioned truncated pyramid may be formed with two oppositely inclined grooves which intersect each other to thereby form a pair of spoke-like portions joined each other in an X-shaped pattern.

A mold according to the invention can be employed in either injection molding of a synthetic resin or die casting of a light metal alloy. In either case there is no need of modifying conventional injection molding or die casting methods.

BRIEF DESCRIPTION OF THE DRAWINGS

FIG. 1 is a partial front view of a wheel cover which can be produced by using a mold according to the invention;

FIG. 2 is a sectional view taken along the line 2—2 in FIG. 1;

DETAILED DESCRIPTION OF THE INVENTION

Figure 3:
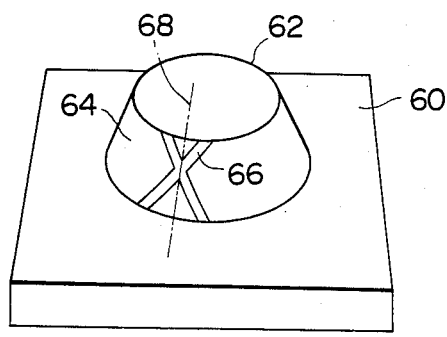
FIG. 3 is a perspective view of a simplified model of a core block in a conventional mold for molding a wheel cover having spoke-like portions which are oblique with respect to both the center axis and radii of the wheel cover.

FIGS. 1 and 2 show a wheel cover which is fundamentally an assembly of a front or outer cover member 10 and an inner cover member 30. In FIG. 2 numeral 2 indicates a road wheel disc.

The outer cover member 10 is a generally circular one-piece member formed by injection molding of a synthetic resin. This cover member 10 has a central portion 12 in the form of a circular and shallow pan, a radially outer ring portion 14 and a plurality of elongate spoke-like portions 16 (hereinafter referred to simply as spokes) which extend from the radially outer periphery of the pan-shaped central portion 12 to the radially inner periphery of the ring portion 14. Each spoke 16 extends aslant from a radial line and intersects an adjacent and oppositely inclined spoke 16 to provide an X-shaped pattern. The intersection 22 of the two spokes 16 is a consolidated joint. Each spoke 16 has end portions 18 and 20 where the thickness is larger than in the remaining portion. All the spokes 16 are oblique with respect to the center axis CL of the wheel cover such that the central portion 12 of the cover member 10 is held axially outward from the ring portion 14. The surfaces of the cover member 10 including the spokes 16 have metallic luster as the result of a suitable surface treatment such as chromium plating or vacuum metallizing.

The inner cover member 30 is a generally circular one-piece member formed by injection molding of a synthetic resin. A central portion 32 of this cover member 30 in the shape of a saucer is formed with a circular opening 33 in the center to prevent contact of the cover member 30 with the hub 4 of the wheel axle. The central portion 32 merges into an intermediate plate portion 36 which stretches to a radially outer ring portion 34. As simulated spokes, a plurality of elongate ribs 40 are formed on the front surface of the intermediate plate portion 36 so as to extend from the radially outer periphery of the central portion 32 to the radially inner periphery of the ring portion 34. Each of these simulated spokes 40 has end portions 42 and 44 where the thickness of the simulated spoke is larger than in the remaining portion. Each simulated spoke 40 is slant from a radial line and intersects an adjacent and oppositely inclined simulated spoke 40, as indicated at 46, to provide an X-shaped pattern. All the simulated spokes 40 are oblique with respect to the center axis CL such that the central portion 32 of the cover member 30 is held axially outward from the ring portion 34. A suitable metallic treatment is made to give metallic luster to the cover member 30, but the front surface of the intermediate plate portion 36 is painted black except the simulated spokes 40. The intermediate plate portion 36 may be omitted when the mechanical strength of the inner cover member 30 is sufficient by using only spoke-like portions as bridge elements between the central portion 32 and the outer ring portion 34.

As can be seen in FIG. 2, the ring portion 14 of the outer cover member 10 is fitted in the ring portion 34 of the inner cover member 30, and the latter is fixed to the former by screws 50. The central portion 12 of the outer cover member 10 is formed with bosses 24 on the back side, so that the central portion 32 of the inner cover member 30 is fastened to the outer cover member 10 by fitting screws 48 into tap holes in the respective bosses 24. Numeral 26 indicates a trim ring formed of a sheet metal, which is fitted on the ring portion 14 of the outer cover member 10 for ornamental and reinforcing purposes.

The assembled wheel cover is secured to the wheel rim 6 by means of resilient clips 54 each of which is inserted into a gap between the wheel rim 6 and a projection 52 formed on the back side of the ring portion 34 of the inner cover member 30

The outer and inner cover members 10 and 30 of the above described wheel cover are formed by the same injection molding method. The two molds used for molding the respective cover members 10 and 30 are similar in construction though different in design. In the mold for molding the outer cover member 10, for example, cavities for shaping the central portion 12, ring portion 14 and spokes 16 are produced when a core side of the mold is brought into engagement with a cavity side. The cavities for shaping the central and ring portions 12 and 14 will need no description. These two cavities are connected by a plurality of elongate cavities for shaping the spokes 16. To provide the spoke-shaping cavities, the spoke-forming portion of the core side of the mold is formed with elongate grooves in a surface which stretches between the central cavity for shaping the central portion 12 and the annular cavity for shaping the ring portion 14. Since the spokes 16 to be formed are oblique with respect to the center axis CL of the cover member 10, the aforementioned surface in the spoke-forming portion must be a tapered surface.

Figure 4:
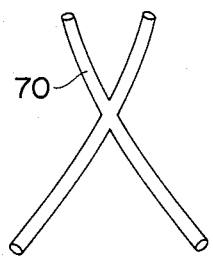
FIG. 4 is an explanatory illustration of a spoke-like element formed by using a mold core block of the type shown in FIG. 3.

FIG. 3 shows the core side, denoted by numeral 60, of the above described mold as a simplified model. Because of the generally circular shape of the cover member 10 and the axially distant arrangement of the central portion 12 and the ring portion 14, it is a natural way of thinking to shape the spoke-forming portion 62 of the core side 60 into the form of a truncated cone. That is, a conical surface 64 is employed as the aforementioned tapered surface. Numeral 66 indicates two grooves formed in the conical surface 64 to form a pair of spokes arranged slantwise and crosswise. It is intended to extend these grooves 66 each along a straight line. Actually, however, each groove 66 becomes gently curved along a part of an ellipse because the spoke-forming portion 62 is circular in cross-sections and each groove 66 is oblique with respect to a generatrix 68 of the truncated cone. FIG. 4 is an explanatory illustration of spokes 70 formed by using a mold in which the core side is as illustrated in FIG. 3. In conformance with the curved shape of the grooves 66 in the mold, each of the spokes 70 is curved to have a bow-like shape if allowed a little exaggeration.

Figure 5:
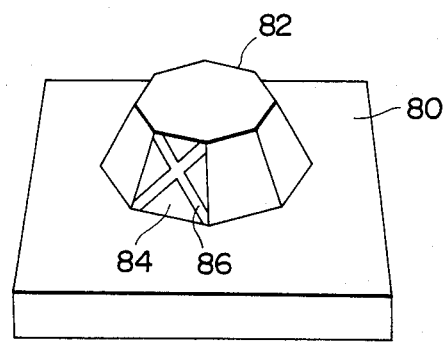
FIG. 5 is a perspective view of a simplified model of a core block in a mold according to the invention.
Figure 6:
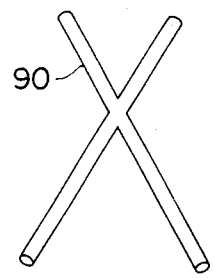
FIG. 6 is an explanatory illustration of a spoke-like element formed by using a mold according to the invention.

FIG. 5 shows the core side, denoted by numeral 80, of a mold according to the invention as a simplified model for comparison with FIG. 3. In this core side 80 of the mold the spoke-forming portion 82 is shaped into the form of a truncated regular pyramid. That is, the spoke-forming portion 82 has a plurality of flat and trapezoidal faces 84 instead of the conical surface 64 in FIG. 3. In each of these flat faces 84, a pair of grooves 86 are formed for forming a pair of spokes arranged slantwise and crosswise. As will be understood, the number of the faces 84 of the pyramid is made equal to the number of the pairs of spokes in the cover member 10 to be formed. In the spoke-forming portion 82 in FIG. 5, each of the grooves 86 extends accurately along a straight line since each of the tapered faces 84 is a flat surface. FIG. 6 shows spokes 90 formed by using a mold in which the core side is as illustrated in FIG. 5. As a natural consequence, each of these spokes 90 extends really straight.

Figure 7:
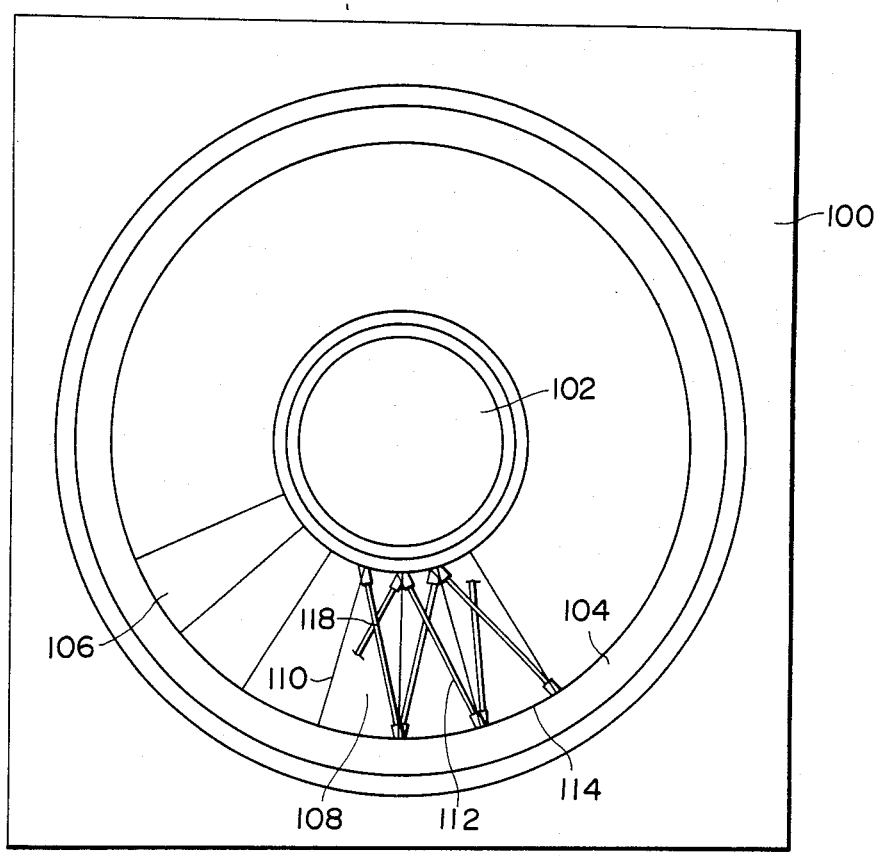
FIG. 7 is a front view of a core block in a mold according to the invention.
Figure 8:
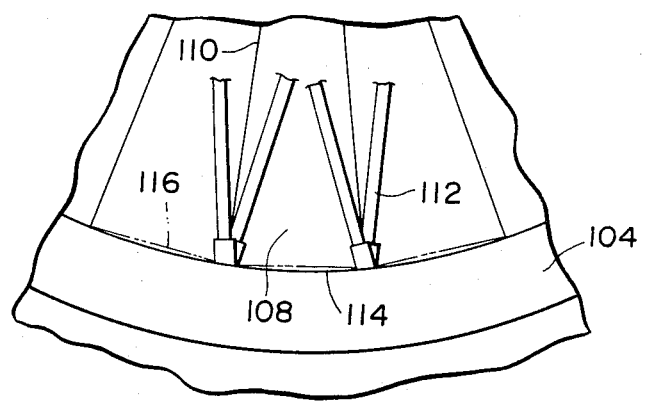
FIG. 8 is a partial enlargement of FIG. 7.
Figure 9:
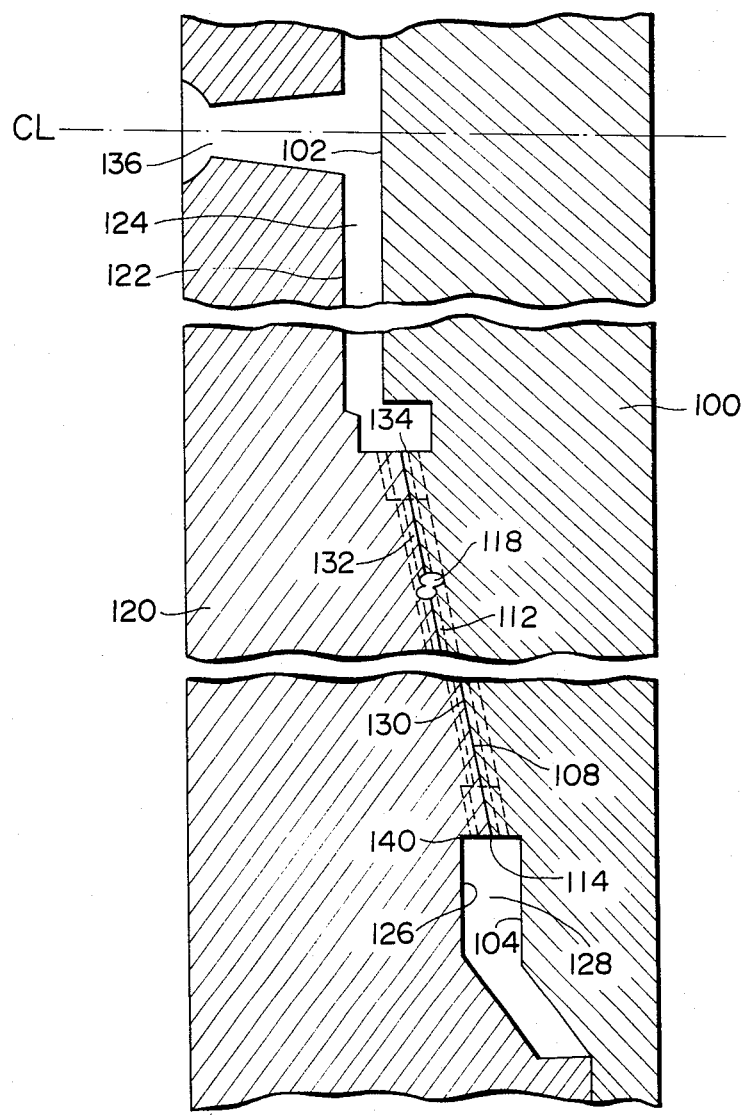
FIG. 9 schematically shows the core block of FIG. 7 in a section taken along the line 9—9 in FIG. 7 together with a mating cavity block.

FIGS. 7 to 9 show a core side 100 of an injection mold according to the invention for molding the outer cover member 10 of the wheel cover of FIG. 1. In FIG. 9 the core side 100 is in engagement with a cavity side 120 of the mold. In a central portion of the mold, the core side 100 has a generally circularly shaped area 102 (the illustration of this area is simplified) and the cavity side 120 is formed with a generally cylindrical recess 122 such that a cavity 124 for forming the central portion 12 of the cover member 10 is produced in the mold closed as shown in FIG. 9. In a radially outer portion of the mold, a generally annularly shaped area 104 of the core side 100 and a generally annular recess 126 in the cavity side 120 provide a cavity 128 for forming the ring portion 14 of the cover member 10.

An intermediate portion 106 of the core side 100 is shaped into the form of a truncated regular pyramid having a desired number of faces 108. Naturally each of these faces 108 is flat and oblique with respect to the center axis CL of the mold, and in plan view of the core side 100 the edges 110 of the truncated pyramid extend radially. In each flat face 108, two linear grooves 112 are formed so as to extend from the radially outer periphery of the central cavity 124 to the radially inner periphery of the annular cavity 128. The two grooves 112 are respectively slant with respect to the edges 110 of that face 108 and intersect each other at point 118.

An intermediate portion of the cavity side 120 of the mold is formed with a recess which is defined by flat and slant wall faces 130 such that the flat faces 108 of the core side 100 come into contact with these flat wall faces 130 respectively, when the mold is closed. In each of the flat wall faces 130 in the cavity side 120, two linear grooves 132 are formed so as to mate with and entirely overlap with the two grooves 112 in the mating flat face 108 of the core side 100. Thus, the grooves 112 in the core side 100 and the mating grooves 132 in the cavity side 120 jointly provide an X-shaped cavity which bridges the central and outer cavities 124 and 128 and in which a pair of spokes 16 of the cover member 10 are formed. As will be understood from the preceding description with reference to FIGS. 5 and 6, each of the spokes 16 formed in this mold extends along a straight line. In FIG. 9 numeral 134 indicates the parting plane in the mold and numeral 136 a sprue.

As shown in FIG. 8, the base 114 of each "trapezoidal" face 108 is modified to an arc to thereby render the radially inner periphery of the annular cavity 128 really circular. If the base of each flat face 108 is straight as shown by phantom line 116, the radially inner periphery of the cavity 128 becomes polygonal. In the closed mold, the axial distance of the arc-shaped base 114 of each face 108 in the core side 100 from a given plane 140 in the cavity side 120 varies along the length of the base 114 and becomes largest in the middle of the two edges 110 of that face 108.

The arrangement of the spoke-forming grooves 112 and 132 in the above described embodiment is only by way of example. Where it is intended to form straight spokes which extend obliquely with respect to both the center axis and radii of the wheel cover, the present invention is always useful whether each spoke intersects another spoke or not.

What is claimed is:

1. A mold for molding a melted material into a wheel cover member for a vehicle road wheel, the wheel cover member being a one-piece member having a plurality of spoke-like portions extending from a central portion of the cover member to a generally annular radially outer peripheral portion of the cover member obliquely with respect to the radii of the cover member and also with respect to the center axis of the cover member such that said central portion is held axially outward from said peripheral portion, the mold having first and second mold members correspondingly shaped so as to provide a first cavity to form said central portion, a second cavity to form said peripheral portion and a third cavity which connects said first and second cavities and in which said spoke-like portions are formed when the mold is closed by contact of the first and second mold members with each other, characterized in that said first mold member has a portion generally in the shape of a truncated pyramid of which the side faces provide a first group of flat surfaces slanting with respect to the center axis of the mold and of which the edges between the base thereof and said side faces are adjacent said second cavity, that the second mold member is recessed so as to provide a second group of flat surfaces which are respectively opposite to and can mate with the flat surfaces of said first group, and that at least one of (i) said first group of flat surfaces and (ii) said second group of flat surfaces are formed with elongate and straight grooves which provide said third cavity.

2. A mold according to claim 1, wherein each of said edges of said portion of said first mold member is outwardly arcuate such that the radially inner periphery of said second cavity becomes circular.

3. A mold according to claim 1, wherein each of said flat surfaces of the first group is formed with two elongate and straight grooves which intersect each other.

* * * * *